3,538,087
OXADIAZOLE DERIVATIVES
Franz Troxler, Bottmingen, and Adolf Lindenmann, Basel, Switzerland, assignors to Sandoz Ltd. (also known as Sandoz A.G.), Basel, Switzerland
No Drawing. Filed Sept. 21, 1967, Ser. No. 669,371
Claims priority, application Switzerland, Sept. 23, 1966, 13,774; Apr. 11, 1967, 5,117
Int. Cl. C07d 85/52
U.S. Cl. 260—240                    12 Claims

ABSTRACT OF THE DISCLOSURE

The present invention provides compounds of formula:

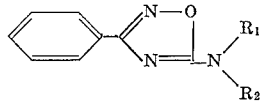

wherein either $R_1$ and $R_2$ together with the nitrogen atom are 4-(2-hydroxyethyl)-1-piperazinyl, or $R_1$ is lower alkyl of 1 to 4 carbon atoms, and $R_2$ is 1-methyl-4-piperidyl, 2-(1-methyl-2-piperidyl)-ethyl, or a radical of the formula —A—$NR_3R_4$, wherein A is straight or branched alkylene of 2 to 4 carbon atoms, $R_3$ is hydrogen or lower alkyl of 1 to 4 carbon atoms, and $R_4$ is lower alkyl of 1 to 4 carbon atoms or cycloalkyl of 3 to 7 carbon atoms or, when $R_3$ is lower alkyl of 1 to 4 carbon atoms, $R_4$ is also lower alkenyl or alkinyl of 3 to 5 carbon atoms, and pharmaceutically acceptable salts thereof.

The compounds are indicated for use as analgesics/antiphlogistics in the treatment of pain and inflammations of various origins.

---

The present invention relates to new heterocyclic compounds and processes for their production.

The present invention provides oxadiazole derivatives of Formula I:

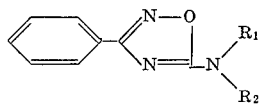

in which either:

$R_1$ and $R_2$ together with the nitrogen atom signify a 4-(2-hydroxyethyl)-1-piperazinyl radical, or $R_1$ signifies a lower alkyl radical of 1 to 4 carbon atoms, and $R_2$ signifies a 1-methyl-4-piperidyl radical, a 2-(1-methyl-2-piperidyl)ethyl radical, or a radical of the formula
—A—$NR_3R_4$, wherein:

A signifies a straight or branched alkylene radical of 2 to 4 carbon atoms, $R_3$ signifies hydrogen or a lower alkyl radical of 1 to 4 carbon atoms, and $R_4$ signifies a lower alkyl radical of 1 to 4 carbon atoms or a cycloalkyl radical of 3 to 7 carbon atoms or, when $R_3$ signfies lower alkyl of 1 to 4 carbon atoms, $R_4$ also signifies a lower alkenyl or alkinyl radical of 3 to 5 carbon atoms, and their salts with inorganic or organic acids.

The present invention further provides processes for the production of compounds I and their acid addition salts, characterized in that (a) Compounds of Formula Ia,

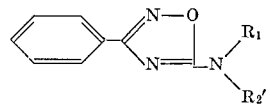

in which either:

$R_1$ and $R_2'$ together with the nitrogen atom signify a 4-(2-hydroxyethyl)-1-piperazinyl radical, or $R_1$ signifies a lower alkyl radical of 1 to 4 carbon atoms, and $R_2'$ signifies a 1-methyl-4-piperidyl radical, a 2-(1-methyl-2-piperidyl)ethyl radical or a radical of formula
—A—$NR_3'R_4'$ wherein:

$R_3'$ signifies a lower alkyl radical of 1 to 4 carbon atoms, and $R_4'$ signifies a lower alkyl radical of 1 to 4 carbon atoms, a cycloalkyl radical of 3 to 7 carbon atoms or a lower alkenyl or alkinyl radical of 3 to 5 carbon atoms, and A has the above significance, are produced by reacting 5-chloro-3-phenyl-1,2,4-oxadiazole with an amine of the general Formula II,

in which $R_1$ and $R_2'$ have the above significance, in the presence of an acid-binding agent, or (b) Compounds of Formula Ib,

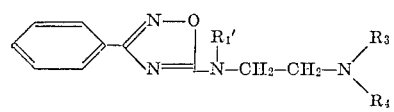

in which:

$R_1'$ signifies a lower alkyl radical of 1 to 4 carbon atoms, and $R_3$ and $R_4$ have the above significance, are produced by reducing an imine of Formula III,

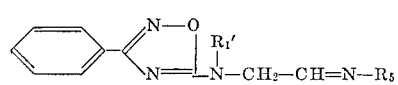

in which:

$R_1'$ has the above significance, and $R_5$ signifies a lower alkyl radical of 1 to 4 carbon atoms or a cycloalkyl radical of 3 to 7 carbon atoms, with sodium borohydride, and, if desired, the reduction product is reacted in the presence of an acid-binding agent, (α) With a compound of Formula IV,

  X—$R_4'$         IV in which X signifies the acid radical of a reactive ester, and $R_4'$ has the above significance, when the reduction product is of the Formula $Ib_1$

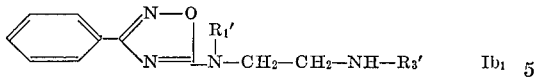

in which $R_1'$ and $R_3'$ have the above significance, or (β) with a compound of Formula V, $$X—R_3' \qquad V$$

in which X and $R_3'$ have the above significance, when the reduction product is of the Formula $Ib_2$,

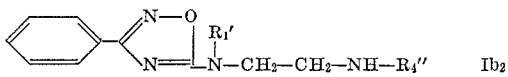

in which:

$R_1'$ has the above significance, and
$R_4''$ signifies a lower cycloalkyl radical, and where salts with inorganic or organic acids are required, the resulting compounds are reacted with inorganic or organic acids.

Preferred methods of producing the compounds of the invention are as follows:

(a) Suitable amines of Formula II are, for example, 1 - (2 - hydroxyethyl)piperazine, N,N,N' - trimethylethylene - diamine, and 1 - methyl - 2 - (2 - methylaminoethyl)piperidine. The reaction of the amine of Formula II with the 5 - chloro - 3 - phenyl - 1,2,4 - oxadiazole is preferably effected in an organic solvent which is inert under the reaction conditions, e.g. benzene, toluene, chloroform or dioxane. An inorganic base, e.g. potassium carbonate, a tertiary organic base, e.g. triethylamine, or preferably a second mol of the amine of Formula II may be used as acid-binding agent. The reaction is usually slightly exothermic and is preferably effected at room temperature. The reaction time usually has a duration of ½ to 1 hour.

The reaction mixture may be worked up be shaking out with water and a water-immiscible organic solvent, e.g. benzene, separating the organic phase, drying, e.g. over magnesium sulphate, and subsequently evaporating the solvent.

(b) 5 - [N - (2 - cyclopropyliminoethyl)methylamino] - 3 - phenyl - 1,2,4 - oxadiazole, 5 - [N - (2 - isopropyliminoethyl)methylamino] - 3 - phenyl - 1,2,4-oxadiazole, 5 - [N - (2 - methyliminoethyl)methylamino] - 3 - phenyl - 1,2,4 - axadiazole and 5 - [N - (2-cyclohexyliminoethyl)methylamino] - 3 - phenyl - 1,2,4-oxadiazole may, for example, be used as imines of Formula III. The reduction in accordance with the invention may, for example, be effected by taking up the imine of Formula III in a lower alkanol, e.g. methanol or ethanol, and adding solid sodium borohydride portionwise to the resulting solution at room temperature. The reduction is completed after a short time (about 30 to 45 minutes) after which the reaction mixture is extracted with water and a water-immiscible organic solvent, e.g. methylene chloride. The organic phase is then separated, dried, e.g. over magnesium sulphate, and evaporated to dryness.

The resulting reduction products have a secondary amino radical on the side chain, which may be converted into a tertiary amino radical by substitution. For this purpose the reduction products are optionally reacted in the presence of an acid-binding agent (α) with a compound of Formula IV, when they have the Formula $Ib_1$, (β) with a compound of Formula V, when they have the Formula $Ib_2$. For example, 5 - [N - (2 - methylaminoethyl)methylamino] - 3 - phenyl - 1,2,4 - oxadiazole is dissolved in an organic solvent which is inert under the reaction conditions, e.g. chloroform or methylene chloride, and after the addition of an acid-binding agent, preferably potassium carbonate, 1 to 1.2 mols of 2-propinyl bromide are added at room temperature while stirring. After several hours the reaction mixture is filtered and the filtrate is evaporated to dryness, whereby 5 - {N - [2 - (N' - methyl - N' - 2 - propinylamino)ethyl] methylamino} - 3 - phenyl - 1,2,4 - oxadiazole is obtained as residue.

The compounds of Formula I obtained by the embodiments of the process described above may be purified in manner known per se, e.g. by crystallization, adsorption chromatography and/or salt formation. They are basic compounds and form stable salts with organic and inorganic acids, which are usually crystalline and water-soluble. The production of these salts is also included in the present invention. Examples of acids for acid addition salt formation are hydrochloric, hydrobromic, sulphuric, maleic, fumaric, tartaric, cyclohexylsulphamic, methane-, benzene- or p-toluene-sulphonic acid.

The imines of Formula III used as starting materials are new and also form part of the present invention. They are produced by condensing a formyl compound of Formula VI,

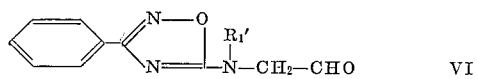

in which $R_1'$ has the above significance, with an amine of Formula VII, $$H_2N—R_5 \qquad VII$$

in which $R_5$ has the above significance, for example, by adding an excess of the amino component, e.g. cyclopropylamine, isopropylamine, cyclohexylamine or methylamine, to the carbonyl component, e.g. 5 - (N - formylmethyl-methylamino) - 3 - phenyl - 1,2,4 - oxadiazole, at room temperature, and concentrating the mixture by evaporation after approximately ¼ to 3 hours. In accordance with another embodiment of the process, the carbonyl component is boiled for 1 to 3 hours in an excess of the amine component dissolved in a suitable organic solvent, preferably benzene, whereby the water resulting from the reaction is continuously removed from the reaction mixture by azeotropic distillation. The solvent and excess amine component are subsequently removed as completely as possible by evaporation. The resulting imines of Formula III may subsequently be purified in manner known per se. However, crude imines may also be used for carrying out the reduction in the process of the invention.

The hitherto unknown formyl compounds of Formula VI may be obtained by reacting 5-chloro-3-phenyl-1,2,4-oxadiazole with a compound of Formula VIII,

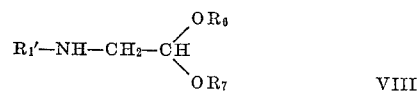

in which:

$R_1'$ has the above significance, and each of
$R_6$ and $R_7$ signifies a lower alkyl radical of 1 to 6 carbon atoms, e.g. methylamino - acetaldehyde - diethylacetal.

The resulting product, e.g. 5 - [N - (2,2 - diethoxyethyl) methylamino] - 3 - phenyl - 1,2,4 - oxadiazole, is subsequently hydrolyzed with an aqueous acid, such as 10% sulphuric acid.

The oxadiazole derivatives of Formula I have hitherto not been described in the literature. They are characterized by valuable pharmacodynamic properties. Thus, in tests effected with animals, they exhibit analgesic/antiphlogistic effects, have monoamine-oxidiase-inhibiting effects, inhibit the effects of reserpine and tetrabenazine and strengthen the reaction of tyramine on the blood pressure and on the nictitating membrane. They furthermore lower the blood pressure of hypertonic animals.

The average daily dose amounts to 0.1 to 10 mg./kg. body weight of small warm-blooded animal.

The compounds of Formula I or their water-soluble, physiologically tolerated acid addition salts may be used as pharmaceuticals on their own or in the form of appropriate medicinal preparations, e.g. tablets, dragées, injectable solutions and suppositories, for administration, e.g. enterally or parenterally. Aside from the usual inorganic and organic, pharmacologically inert adjuvants, e.g. lactose, starch, talcum, stearic acid, water, alcohols, glycerin, natural or hardened oils and waxes, these preparations may also contain suitable preserving, stabilizing or wetting agents, solubilizers, sweetening or colouring substances and flavourings.

The term "in manner known per se" as used herein designates methods in use or described in the literature on the subject.

In the following non-limitative examples all temperatures are indicated in degrees centigrade, without corrections.

EXAMPLE 1

5-[4-(2-hydroxyethyl)-1-piperazinyl]-3-phenyl-1,2,4-oxadiazole 14.5 g. of 1-(2-hydroxyethyl)-piperazine, dissolved in 30 cc. of benzene, are added dropwise to a solution of 10 g. of 5-chloro-3-phenyl-1,2,4-oxadiazole in 100 cc. of benzene while stirring, whereby the temperature rises to about 35°. Stirring is effected for a further hour and the reaction mixture is then shaken out with water. The organic phase is dried over magnesium sulphate and concentrated by evaporation. The compound indicated in the heading crystallizes from methylene chloride/petroleum ether in prisms having a M.P. of 81–83°.

EXAMPLE 2

5-[N-(2-dimethylaminoethyl)methylamino]-3-phenyl-1,2,4-oxadiazole 10 g. of 5-chloro-3-phenyl-1,2,4-oxadiazole, dissolved in 150 cc. of benzene, are added dropwise while stirring to a solution of 34.2 g. of N,N,N'-trimethylethylene-diamine in 140 cc. of benzene, whereby the temperature rises to about 35°. Stirring is effected for a further hour and the reaction mixture is then shaken out with water. The organic phase is separated, dried over magnesium sulphate and concentrated by evaporation. The crude 5-[N-(2-dimethylaminoethyl)methylamino] - 3 - phenyl - 1,2,4 - oxadiazole obtained as residue is converted into its hydrochloride; prisms having a M.P. of 163–165° from methanol/ether.

EXAMPLE 3

5-{N-[2-(1-methyl-2-piperidyl)ethyl]methylamino}-3-phenyl-1,2,4-oxadiazole 9.97 g. of 1-methyl-2-(2-methylaminoethyl)piperidine, dissolved in 20 cc. of benzene, are added dropwise while stirring to a solution of 5.7 g. of 5-chloro-3-phenyl-1,2,4-oxadiazole in 50 cc. of benzene, whereby the temperature rises to about 35°. Stirring is effected for a further hour at room temperature and the reaction mixture is then shaken out with water. The organic phase is separated, dried over magnesium sulphate and concentrated by evaporation. The residue is chromatographed with chloroform on 30 parts of silica gel, whereby 5-{N-[2-(1-methyl-2-piperidyl)ethyl]methylamino}-3-phenyl - 1,2,4 - oxadiazole is washed from the column with chloroform containing 5% of methanol and is then converted into its hydrochloride; prisms having a M.P. of 152–154° from acetone/ether.

EXAMPLE 4

5-[N-(2-cyclopropylaminoethyl)methylamino]-3-phenyl-1,2,4-oxadiazole 10 g. of 5-(N-formylmethyl-methylamino)-3-phenyl-1,2,4-oxadiazole are added portionwise to 50 cc. of cyclopropylamine. The reaction mixture warms itself somewhat and gives a clear solution, which is evaporated to dryness after 1 hour. The resulting 5-[N-(2-cyclopropyliminoethyl)methylamino] - 3 - phenyl-1,2,4-oxadiazole crystallizes in rodlets having a M.P. of 80–82° from ether/petroleum ether.

11.7 g. of 5 - [N - (2 - cyclopropyliminoethyl)methylamino]-3-phenyl-1,2,4-oxadiazole are dissolved in 150 cc. of methanol and 7.3 g. of sodium borohydride are added portionwise to the solution. After 45 minutes the reaction mixture is diluted with 500 cc. of water and is shaken out with methylene chloride. The methylene chloride solution which has been dried over magnesium sulphate is concentrated by evaporation and the 5-[N-(2-cyclopropylaminoethyl)methylamino]-3-phenyl-1,2,4-oxadiazole obtained as residue is converted into its hydrochloride; prisms having a M.P. of 170–172° from methanol/ether.

The 5 - (N - formylmethyl - methylamino)-3-phenyl-1,2,4-oxadiazole used as starting material is produced as follows:

5-chloro - 3 - phenyl-1,2,4-oxadiazole is reacted with methylamino-acetaldehyde-diethylacetal in benzene to give 5 - [N - (2,2 - diethoxyethyl)methylamino]-3-phenyl-1,2,4-oxadiazole, which is split to 5-(N-formylmethyl-methylamino)-3-phenyl-1,2,4-oxadiazole by heating for 30 minutes in 10% aqueous sulphuric acid; rodlets having a M.P. of 98–100° from ether/petroleum ether.

EXAMPLE 5

5-[N-(2-isopropylaminoethyl)methylamino]-3-phenyl-1,2,4-oxadiazole 12 g. of 5-(N-formylmethyl-methylamino)-3-phenyl-1,2,4-oxadiazole are dissolved in 60 cc. of benzene, 12 cc. of isopropylamine are added and heating at reflux is effected for 1½ hours, whereby the resulting water is continually removed with a water separator by azeotropic distillation. The solution is subsequently evaporated to dryness, the crude 5-[N-(2-isopropyliminoethyl)methylamino]-3-phenyl-1,2,4-oxadiazole obtained as residue is taken up in 60 cc. of methanol and 6 g. of sodium borohydride are added portionwise to the solution. After about 45 minutes the reaction mixture is diluted with 200 cc. of water and is shaken out with methylene chloride. The methylene chloride solution which has been dried over magnesium sulphate is concentrated by evaporation and the 5 - [N - (2 - isopropylaminoethyl)methylamino]-3-phenyl-1,2,4-oxadiazole obtained as residue is converted into its hydrochloride; prisms having a M.P. of 162–164° after crystallization from methanol/acetone.

EXAMPLE 6

5-[N-(2-methylaminoethyl)methylamino]-3-phenyl-1,2,4-oxadiazole

A solution of 12 g. of 5-(N-formylmethyl-methylamino)-3-phenyl-1,2,4-oxadiazole and 12 cc. of methylamine in 50 cc. of absolute benzene is heated at reflux for 30 minutes, whereby the resulting water is continuously removed with a water separator by azeotropic distillation. The solution is subsequently evaporated to dryness, the crude 5-[N-(2-methyliminoethyl)methylamino]-3-phenyl-1,2,4-oxadiazole obtained as residue is dissolved in 60 cc. of methanol and 6 g. of sodium borohydride are added in small portions. After about 45 minutes the reaction mixture is diluted with 200 cc. of water and is shaken out with methylene chloride. The methylene chloride solution which has been dried over magnesium sulphate is concentrated by evaporation and the 5-[N-(2-methylaminoethyl)methylamino]-3-phenyl - 1,2,4 - oxadiazole obtained as residue is converted into its hydrochloride; prisms having a M.P. of 154–156° after crystallization from methanol/acetone.

EXAMPLE 7

5-[N-(2-cyclohexylaminoethyl)methylamino]-3-phenyl-1,2,4-oxadiazole

A solution of 15 g. of 5-(N-formylmethyl-methylamino)-3-phenyl-1,2,4-oxadiazole and 15 cc. of cyclohexylamine in 60 cc. of absolute benzene is heated at reflux for 1½ hours, whereby the resulting water is continuously removed with a water separator by azeotropic distillation. The solution is subsequently evaporated to dryness, the crude 5-[N-(2-cyclohexyliminoethyl-methylamino]-3-phenyl-1,2,4-oxadiazole obtained as residue is taken up in 75 cc. of methanol and 7.5 g. of sodium borohydride are added portionwise to the solution. After about 45 minutes the reaction mixture is diluted with 250 cc. of water and is shaken out with methylene chloride. The methylene chloride solution which has been dried over magnesium sulphate is concentrated by evaporation and the 5 - [N - (2 - cyclohexylaminoethyl)methylamino]-3-phenyl-1,2,4-oxadiazole obtained as residue is converted into its hydrochloride; prisms having a M.P. of 188–190° after crystallization from methanol/acetone.

EXAMPLE 8

5-{N-[2-(N'-methyl-N'-2-propinylamino)ethyl]
methylamino}-3-phenyl-1,2,4-oxadiazole After adding 6.7 g. of potassium carbonate to 6.7 g. of crude 5 - [N - (2 - methylaminoethyl)methylamino]-3-phenyl-1,2,4-oxadiazole (production see Example 6) dissolved in 100 cc. of methylene chloride, 3.78 g. of 2-propinyl bromide in 20 cc. of methylene chloride are added dropwise while stirring. After stirring for several hours at room temperature, the reaction mixture is filtered and concentrated by evaporation. The crude 5 - {N - [2 - (N'-methyl - N' - 2 - propinylamino)ethyl]methylamino}-3-phenyl - 1,2,4 - oxadiazole is filtered with methylene chloride containing 2% of methanol through 20 parts of silica gel and is subsequently converted into its hydrochloride; prisms having a M.P. of 153–155° from methanol/ether.

EXAMPLE 9

Galenical preparation: Tablets

|  | G. |
|---|---|
| 5 - [N - (2 - cyclopropylaminoethyl)methylamino] - 3 - phenyl - 1,2,4-oxadiazole hydrochloride (compound of Example 4) | [1] 0.0228 |
| Magnesium stearate | 0.0010 |
| Polyvinyl pyrrolidone | 0.0040 |
| Talcum | 0.0080 |
| Maize starch | 0.010 |
| Lactose | 0.1107 |
| Dimethylsilicone oil | 0.0005 |
| Polyethylene glycol 6000 | 0.0030 |
| For a tablet of | 0.160 |

[1] Corresponds to 20 mg. of the free base.

What is claimed is:
1. A compound of the formula:

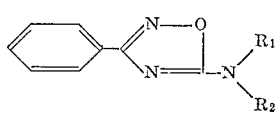

wherein either $R_1$ and $R_2$ together with the nitrogen atom are 4 - (2 - hydroxyethyl) - 1-piperazinyl, or $R_1$ is lower alkyl of 1 to 4 carbon atoms, and $R_2$ is 1-methyl-4-piperidyl, 2 - (1 - methyl - 2-piperidyl)ethyl, or a radical of the formula —A—$NR_3R_4$, wherein A is straight or branched alkylene of 2 to 4 carbon atoms, $R_3$ is hydrogen or lower alkyl of 1 to 4 carbon atoms, and $R_4$ is cycoalkyl of 3 to 7 carbon atoms or, when $R_3$ is lower alkyl of 1 to 4 carbon atoms, $R_4$ is also lower alkenyl or alkinyl of 3 to 5 carbon atoms, and a pharmaceutically acceptable salt thereof.

2. 5 - [4 - (2 - hydroxyethyl)-1-piperazinyl]-3-phenyl-1,2,4-oxadiazole.

3. 5 - [N - (2 - dimethylaminoethyl)methylamino]-3-phenyl-1,2,4-oxadiazole.

4. 5 - {N - [2 - (1-methyl-2-piperidyl)ethyl]methylamino}-3-phenyl-1,2,4-oxadiazole.

5. 5 - [N - (2 - cyclopropylaminoethyl)methylamino]-3-phenyl-1,2,4-oxadiazole.

6. 5 - [N - (2 - isopropylaminoethyl)methylamino]-3-phenyl-1,2,4-oxadiazole.

7. 5 - [N - (2 - methylaminoethyl)methylamino]-3-phenyl-1,2,4-oxadiazole.

8. 5 - [N - (2 - cyclohexylaminoethyl)methylamino]-3-phenyl-1,2,4-oxadiazole.

9. 5 - {N - [2 - (N'-methyl-N'-2-propinylamino)ethyl]methylamino}-3-phenyl-1,2,4-oxadiazole.

10. A compound of the formula:

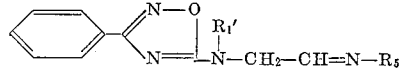

wherein $R_1'$ is lower alkyl of 1 to 4 carbon atoms, and $R_5$ is lower alkyl of 1 to 4 carbons or cycloalkyl of 3 to 7 carbon atoms.

11. A compound in accordance with claim 1 wherein $R_1$ is a lower alkyl of 1 to 4 carbon atoms; $R_2$ is

—A—$NR_3R_4$ wherein A is a straight alkylene of 2 to 4 carbon atoms; $R_3$ is hydrogen; and $R_4$ is cycloalkyl of 3 to 7 carbon atoms.

12. A compound in accordance with claim 1 wherein $R_1$ is a lower alkyl radical of 1 to 4 carbon atoms; $R_2$ is —$CH_2$—$CH_2$—NH—$R_4$, wherein $R_4$ is cycloalkyl of 3 to 7 carbon atoms.

References Cited

Selim et al., Bull. Soc. Shim. France 1967, pp. 1219 to 1220 (April 1967).

JOHN D. RANDOLPH, Primary Examiner

U.S. Cl. X.R.

260—268, 294.7, 307; 424—272